United States Patent
Duffie, III et al.

(10) Patent No.: US 8,005,978 B1
(45) Date of Patent: Aug. 23, 2011

(54) METHOD TO OPTIMIZE THE LOAD BALANCING OF PARALLEL COPROCESSORS

(75) Inventors: John B. Duffie, III, Apex, NC (US); Jay S. Shah, Cary, NC (US); Bruce E. Sinclair, Carrboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 2123 days.

(21) Appl. No.: 10/087,376

(22) Filed: Mar. 1, 2002

(51) Int. Cl.
*G06F 15/173* (2006.01)
*G06F 15/16* (2006.01)
*G06F 9/46* (2006.01)
*G06F 11/00* (2006.01)

(52) U.S. Cl. ........ 709/235; 709/226; 709/229; 709/234; 718/102; 370/229; 370/230; 370/235; 370/238; 370/252; 370/392; 370/401

(58) Field of Classification Search .................. 718/100, 718/105, 102; 705/8; 709/226, 229, 100–105, 709/225, 234, 235; 370/229, 230, 235, 238, 370/252, 392, 401
See application file for complete search history.

(56) References Cited

U.S. PATENT DOCUMENTS

| | | | | |
|---|---|---|---|---|
| 5,325,493 A | * | 6/1994 | Herrell et al. | 712/201 |
| 5,479,407 A | * | 12/1995 | Ko et al. | 370/231 |
| 5,485,559 A | * | 1/1996 | Sakaibara et al. | 345/505 |
| 5,495,426 A | | 2/1996 | Waclawsky et al. | |
| 5,613,069 A | * | 3/1997 | Walker | 709/238 |
| 5,644,720 A | * | 7/1997 | Boll et al. | 709/227 |
| 5,774,660 A | * | 6/1998 | Brendel et al. | 709/201 |
| 5,774,668 A | * | 6/1998 | Choquier et al. | 709/223 |
| 5,781,199 A | * | 7/1998 | Oniki et al. | 345/505 |
| 5,819,045 A | * | 10/1998 | Raman et al. | 709/226 |
| 5,999,565 A | | 12/1999 | Locklear, Jr. et al. | |
| 6,032,194 A | | 2/2000 | Gai et al. | |
| 6,065,046 A | * | 5/2000 | Feinberg et al. | 709/216 |
| 6,065,062 A | | 5/2000 | Periasamy et al. | |
| 6,111,877 A | | 8/2000 | Wilford et al. | |
| 6,115,390 A | * | 9/2000 | Chuah | 370/443 |
| 6,157,955 A | * | 12/2000 | Narad et al. | 709/228 |
| 6,178,160 B1 | | 1/2001 | Bolton et al. | |
| 6,223,205 B1 | * | 4/2001 | Harchol-Balter et al. | 718/105 |
| 6,252,878 B1 | | 6/2001 | Locklear, Jr. et al. | |
| 6,317,775 B1 | | 11/2001 | Colie et al. | |
| 6,370,560 B1 | * | 4/2002 | Robertazzi et al. | 718/105 |
| 6,388,995 B1 | | 5/2002 | Gai et al. | |
| 6,400,681 B1 | | 6/2002 | Bertin et al. | |
| 6,570,571 B1 | * | 5/2003 | Morozumi | 345/505 |
| 6,587,866 B1 | * | 7/2003 | Modi et al. | 718/105 |
| 6,591,298 B1 | * | 7/2003 | Spicer et al. | 709/224 |
| 6,614,808 B1 | * | 9/2003 | Gopalakrishna | 370/469 |

(Continued)

*Primary Examiner* — John Follansbee
*Assistant Examiner* — Saket K. Daftuar
(74) *Attorney, Agent, or Firm* — Cesari and McKenna, LLP

(57) ABSTRACT

A technique for optimally balancing the load between a series of coprocessors that takes into consideration the load associated with each coprocessor. A cost associated with a packet is determined. This cost along with the coprocessor's current load is used to determine an anticipated load. The anticipated load is used to select a coprocessor that is to process the packet. In one embodiment, the coprocessor with the minimal anticipated load is selected. In another embodiment, an output port associated with the packet is checked to determine if it is congested. If so, a coprocessor other than the coprocessor with the minimum load is selected.

35 Claims, 6 Drawing Sheets

U.S. PATENT DOCUMENTS

| | | | |
|---|---|---|---|
| 6,650,643 B1 * | 11/2003 | Dobson | 370/395.1 |
| 6,748,437 B1 * | 6/2004 | Mankude et al. | 709/227 |
| 6,986,139 B1 * | 1/2006 | Kubo | 718/105 |
| 7,012,921 B2 * | 3/2006 | Dobson | 370/395.1 |
| 7,024,671 B2 * | 4/2006 | Yamashita | 718/102 |
| 7,092,985 B2 * | 8/2006 | Hubbard | 709/201 |
| 7,127,716 B2 * | 10/2006 | Jin et al. | 718/105 |
| 2005/0005272 A1 * | 1/2005 | Moody et al. | 718/104 |

* cited by examiner

METHOD TO OPTIMIZE THE LOAD BALANCING OF PARALLEL COPROCESSORS

BACKGROUND OF THE INVENTION

1. Field of the Invention

This invention relates generally to parallel coprocessors and more specifically to the load balancing of parallel coprocessors.

2. Background Information

A computer network is a geographically distributed collection of interconnected communication links for transporting data between nodes, such as computers. Many types of computer networks are available, with the types ranging from local area networks (LANs) to wide area networks (WANs). The nodes typically communicate by exchanging discrete frames or packets of data according to pre-defined protocols, such as the Transmission Control Protocol (TCP).

A computer network is often comprised of one or more intermediate nodes, such as switches or routers. These intermediate nodes typically comprise a central processor that enables the intermediate router to, inter alia, route or switch the packets of data along the interconnected links from a source node that originates the data to a destination node that is designated to receive the data.

To secure data that is transmitted over the interconnected links, e.g., in the case of a virtual private network (VPN), intermediate nodes often incorporate a technique for encrypting and decrypting data contained in the packets. Often this technique employs an encryption standard, such as the conventional Data Encryption Standard (DES) or the triple-DES (3DES), as described in ANSI X9.52-1998, available from the American National Standards Institute, Washington, D.C, to perform the actual encryption of the data. These encryption standards typically encrypt and decrypt data by applying a mathematical transform to the data. Often the processing necessary to apply this mathematical transform is quite intensive, particularly for intermediate nodes configured to encrypt/decrypt VPN traffic over the secure connections. To avoid overburdening the central processor these nodes often employ one or more coprocessors that are specifically dedicated to offload the computational burden associated with encryption from the processor.

A coprocessor is a highly specialized processing unit that is typically dedicated to performing a single function, such as encryption. Coprocessors typically comprise processing elements and logic implemented as, e.g., application specific integrated circuits (ASIC) that are often tailored to enable the coprocessor to perform its dedicated function at a very high rate of speed. Moreover, each coprocessor is typically associated with its own private first-in-first-out (FIFO) queue that is configured to receive packets for processing by the coprocessor.

In a typical intermediate node that contains a central processor and more than one coprocessors, packets are processed by the coprocessors as follows. First, the central processor selects a coprocessor that is to process the packet. Next, the central processor places the packet on the selected coprocessor's FIFO queue. When the coprocessor completes its processing of the packet, it notifies the central processor that the processing has completed. The central processor then performs whatever additional processing may be required such as, routing or switching the packet.

Intermediate devices often employ a scheduling algorithm to schedule the processing of packets on the various coprocessors. One such scheduling algorithm is a conventional round-robin algorithm. In a typical round-robin implementation, coprocessors are selected in a fixed cyclic order. When a packet is ready to be processed, the next coprocessor in the order is selected to process the packet. For example, assume an intermediate device has two identical coprocessors (CP1 and CP2) and the central processor is configured to place packets on the queues using the round-robin algorithm. The processor begins by placing the first packet on CP1's queue. The next packet is then placed on CP2's queue. The cycle then repeats and the next packet is placed on CP1's queue and so on.

One problem associated with the typical round-robin implementation is that depending on the type of packets and the order in which they are received, it is possible for the load among the processors to become unbalanced. Using the example above, assume every packet CP1 receives is a large packet that requires triple-encryption (e.g., 3DES) processing and every packet assigned to CP2 is half the size and only requires single-encryption (e.g., DES) processing. As the scheduling cycle continues, the load on CP1 will become much greater than the load on CP2; thus, the overall load becomes unbalanced as CP1 bears a greater share of the overall load.

Another commonly used scheduling algorithm is the Shortest-Queue-First (SQF) algorithm. The SQF algorithm uses the number of entries in a queue as criteria for selecting a coprocessor that is to process a packet. The coprocessor with the least number of entries in its FIFO queue is the coprocessor that is selected. Using the example above, assume the central processor uses the SQF algorithm to schedule packet processing on CP1 and CP2, and that CP1 has 2 entries on its queue and CP3 has 3 entries on its queue. Further assume the central processor has a packet that needs to be processed by one of the coprocessors. To select a coprocessor, the processor looks at the number of entries on the queues for both CP1 and CP2 and chooses the coprocessor whose queue has fewer entries. Since CP1 has fewer entries on its queue, it will be selected to process the packet.

One problem with the SQF algorithm is that it does not take into consideration the amount of resources that may be required to process a particular packet. Thus, like the round-robin algorithm, an imbalance in the load between coprocessors may be introduced depending on the packets being processed. For example, assume CP1 has three 100-byte packets on its queue requiring DES processing and CP2 has two 1400-byte packets on its queue requiring 3DES processing. Further assume, a 50-byte packet requiring DES processing is to be scheduled for processing. The central processor will place the 50-byte packet on CP2's queue rather than CP1's queue simply because CP2's queue has fewer entries despite the fact that those entries may require much more processing than the entries on CP1's queue. CP2 will incur a greater share of the load and the overall load among the coprocessors is unbalanced.

Both the round-robin and SQF techniques do not select a coprocessor on the basis of the load incurred by the coprocessor. Rather these techniques select a coprocessor using some other metric, such as queue size or the number of packets received. Thus it is quite possible for the load among the coprocessors to become significantly unbalanced where some coprocessors are heavily loaded while others are not. It would be desirable to have a technique that optimally allocates the processing of packets among a series of coprocessors to ensure that the allocation will not inordinately unbalance the load among the coprocessors.

SUMMARY OF THE INVENTION

The present invention comprises a technique that efficiently allocates processing of a packet to one of a plurality of coprocessors in a manner that optimizes load balancing among the coprocessors. To that end, the novel load balancing technique considers an anticipated load when determining which coprocessor to select for processing the packet. The anticipated load is the load a coprocessor would incur if it were to process the packet given its current load. By taking into consideration the anticipated load, the present technique avoids unduly unbalancing the loads allocated among the coprocessors.

Specifically, the inventive technique determines a cost associated with a packet of a particular size that is to be processed. The cost is a function of a processing rate (Ra) associated with a coprocessor processing the packet using a particular mathematical transform and a transfer rate (Rt) associated with transferring that packet to the coprocessor. This cost is then added to a cumulative load cost associated with the coprocessor's current load to determine an anticipated load for that coprocessor. An anticipated load is then determined for all other coprocessors and the coprocessor with the minimum anticipated load is selected to process the packet. The packet is placed on the selected coprocessor's processing queue and the coprocessor's cumulative load cost is increased to account for the new packet. When the coprocessor completes the processing of the packet, the cumulative load cost is decreased to account for the packet that has been processed.

In one embodiment of the invention, an output port associated with the packet is examined to determine if it is congested. If so, the packet is assigned to a coprocessor other than the coprocessor with the minimum anticipated load.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN
ILLUSTRATIVE EMBODIMENT

Figure 1:
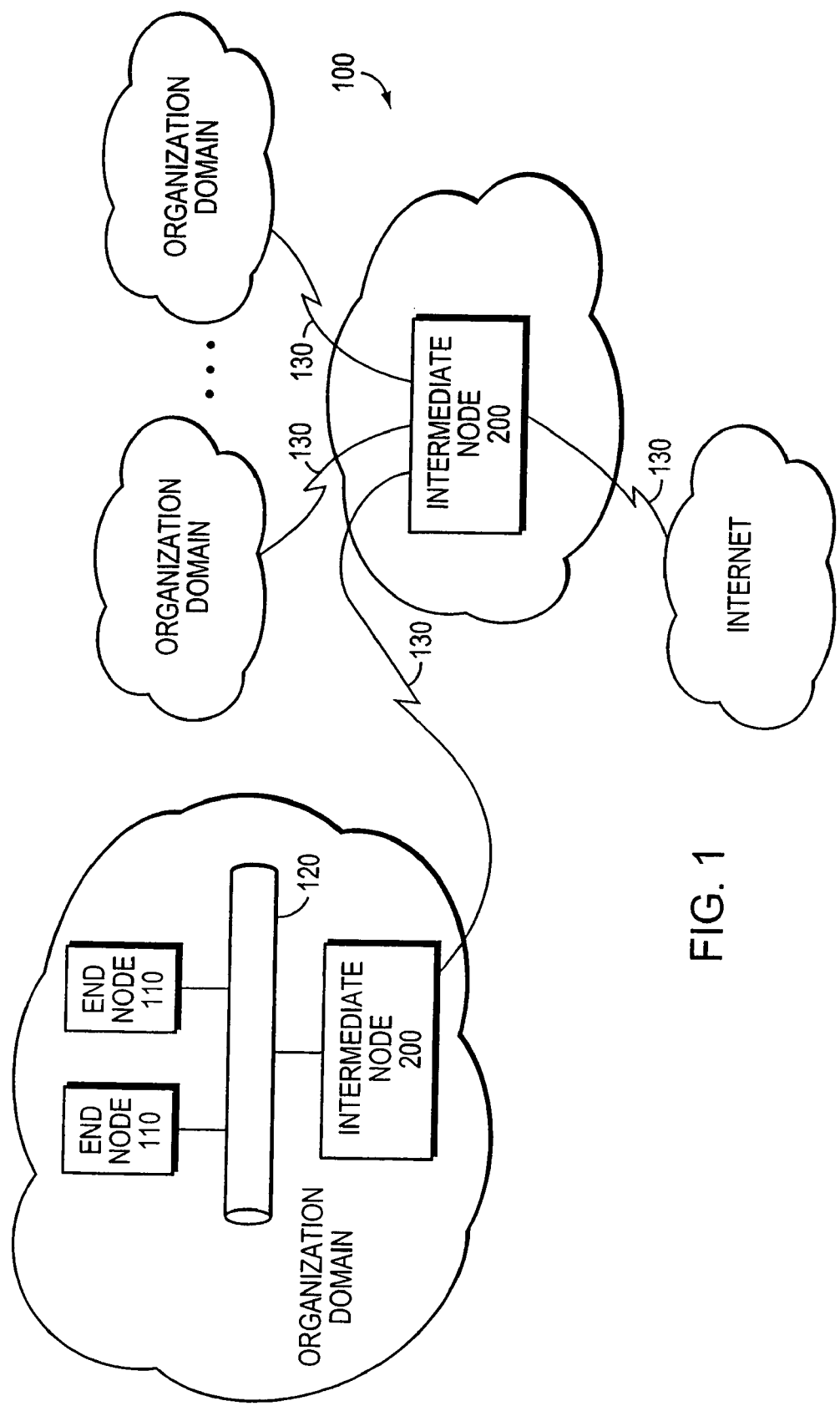
FIG. 1 is a schematic block diagram of a network that can be advantageously used with the present invention.

FIG. 1 is a schematic block diagram of a computer network 100 that can be advantageously used with the present invention. The computer network 100 comprises a collection of communication links and segments connected to a plurality of nodes, such as end nodes 110 and intermediate nodes 200. The network links and segments may comprise local area networks (LANs) 120 and wide area network (WAN) links 130 interconnected by intermediate nodes 200, such as network switches or routers, to form an internetwork of computer nodes. These internetworked nodes communicate by exchanging data packets according to a predefined set of protocols, such as the Transmission Control Protocol/Internet Protocol (TCP/IP) and the Asynchronous Transfer Mode (ATM) protocol.

Figure 2:
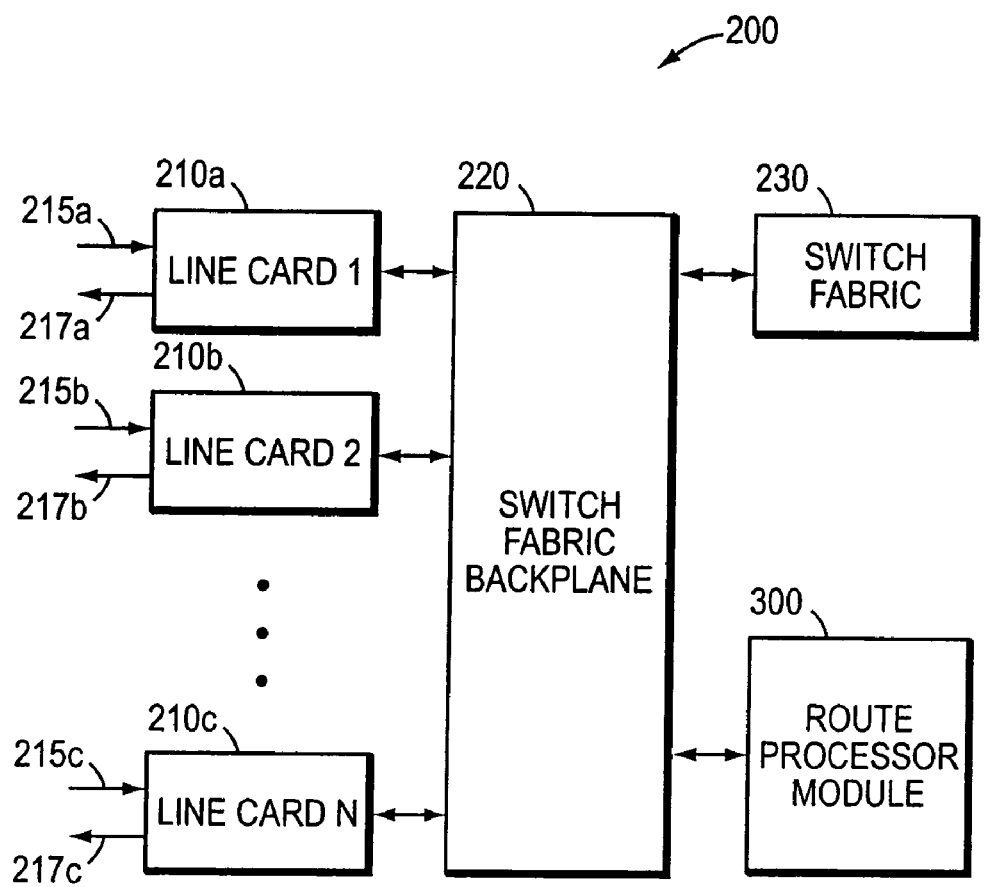
FIG. 2 is a partial schematic block diagram of an intermediate node that can be advantageously used with the present invention.

FIG. 2 is a partial block diagram of an intermediate node (switch) 200 that can be advantageously used with the present invention. An illustrative example of intermediate node 200 that could be used in the computer network 100 is the Cisco MGX 8850 IP+ATM Multiservice Switch, available from Cisco Systems, Incorporated, San Jose, California. The MGX 8850 is designed for service providers deploying narrowband and/or broadband services. The MGX 8850 scales from DS0 to OC48c and supports various services, such as frame relay, ATM, Voice over IP, circuit emulation, IP, wireless aggregation, Digital Subscriber Line (DSL) aggregation, ATM service backbones and Virtual Private Networks (VPN's). The intermediate node 200 comprises a plurality of cards including line cards 210, a switch fabric card 230 and a route processor module card 300 interconnected by a switch fabric backplane 220.

The line cards 210 connect (interface) the switch 200 with the network 100. To that end, the line cards 210 receive and transmit data over the network through the input 215 and output ports 217, respectively, using various protocols, such as OC-48c, DS0, T3 and so on. The line cards 210 forward data received from the network to the switch fabric backplane 220, as well as transmit data received from the backplane 220 to the network. Moreover, the line cards 210 provide various data and control signals to the switch fabric backplane 200 including signals to determine the number of packets dropped at an output port, as well as the number of entries in an output port's transmit queue.

The switch fabric backplane 220 comprises logic and a backplane that provides an interface between the line cards 210, the switch fabric card 230 and the route processor module 300. That is, the switch fabric backplane 220 provides interconnections between the cards that allow data and signals to be transferred from one card to another.

The switch fabric card 230 comprises switch fabric logic (switch fabric) that is configured to switch data between ports located on the cards coupled to the switch fabric backplane 220. For example, data is sent from a given port to the switch fabric card 230. In response, the switch fabric card 230 applies the data to the switch fabric logic and selects a destination port. The data is then switched to the destination port.

Figure 3:
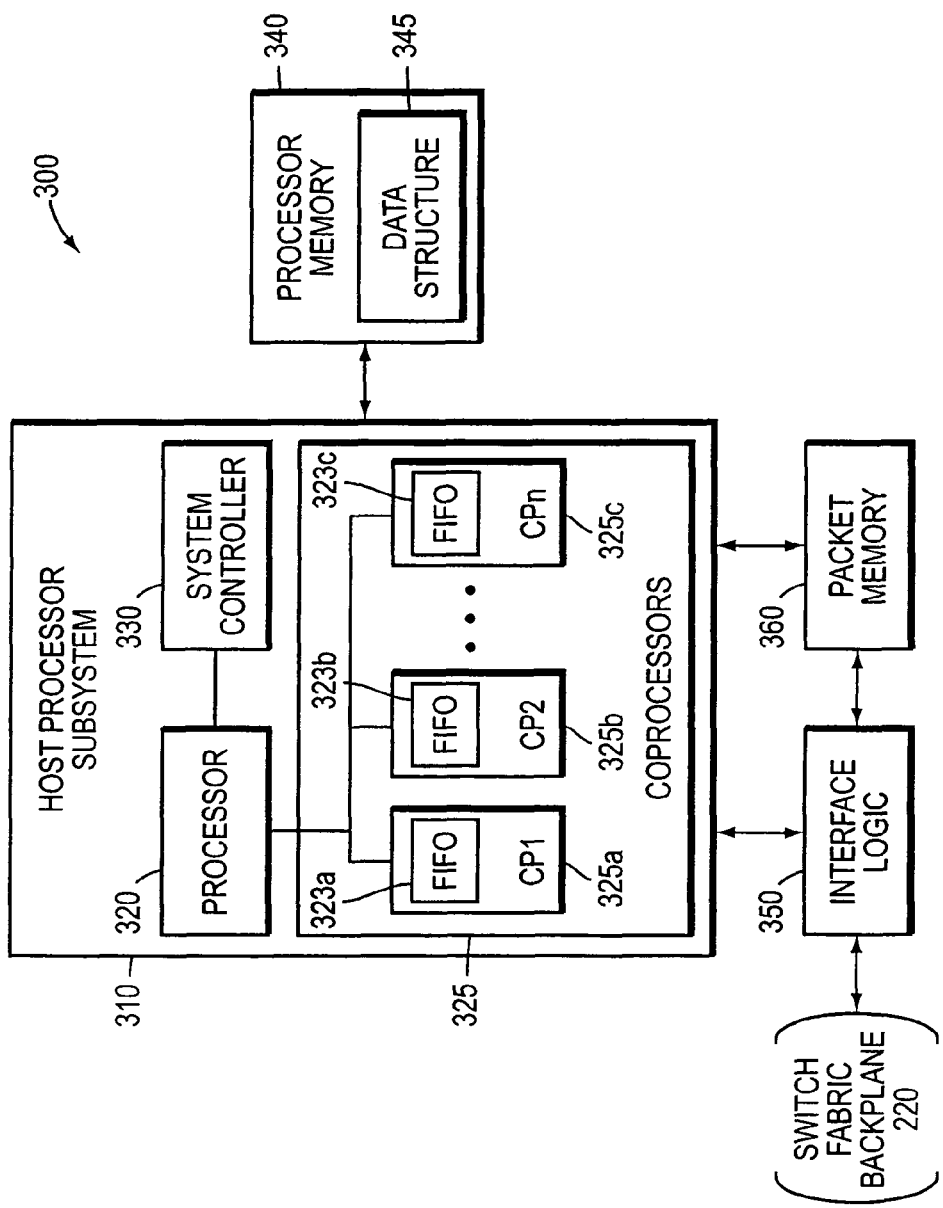
FIG. 3 is a partial schematic block diagram of a route processor module that can be used to implement the present invention.

The route processor (RP) module 300 is adapted to provide processing for incoming and outgoing packets. FIG. 3 is a partial block diagram of the route processor module 300 comprising a host processor 310 subsystem, processor memory 340, interface logic 350 and packet memory 360. The host processor 310 comprises a processor 320 coupled to a system controller 330. The processor 320, in turn, comprises processing elements and logic that are capable of executing instructions and generating memory requests. An example of processor 320 that may be advantageously used with the invention is the MIPS 10000 processor available from Silicon Graphics Incorporated, Mountain View, Calif. The system controller 330 is preferably embodied in a high performance Application Specific Integrated Circuit (ASIC) configured to interface the processor 320 with the processor memory 340 and the packet memory 360.

The host processor 310 further includes one or more coprocessors 325. Each coprocessor is preferably embodied as a high-performance ASIC comprising processing elements and logic that cooperate to perform various mathematical transforms on packets including encrypting and decrypting a packet using, e.g., the DES and 3DES standards. Moreover, each coprocessor contains logic that enables the coprocessor to communicate with processor 320. Each coprocessor 325 is associated with an identifier (ID) that uniquely identifies the coprocessor and a FIFO queue 323 that holds packets to be processed by the coprocessor. Packets destined for each coprocessor 325 are placed on the coprocessor's FIFO queue 323 by the processor 320 and removed from the queue 323 by the coprocessor 325.

The processor memory 340 is a computer readable medium that holds data and one or more software routines each containing executable instructions. These data and software routines enable (adapt) the processor 320 to perform various functions. These functions include performing the methods of the present invention. The processor memory 340 comprises one or more memory devices (not shown) that are capable of storing executable instructions and data. Preferably, these memory devices are industry standard memory devices such as, Synchronous Dynamic Random Access Memory (SDRAM) devices available from Micron Technology, Inc., Boise, Id.

The processor memory 340 preferably includes a data structure 345 for storing information that is used to determine a cost associated with a packet. Preferably, this data structure comprises one or more lookup tables that contain information used by the processor 320 to implement the present invention.

The interface logic 350 comprises hardware logic that, inter alia, provides an interface between the switch fabric backplane 220 (FIG. 2), the packet memory 360 and the host processor 310. The primary function of the interface logic 350 is to interface the packet memory 360 and host processor 310 to the backplane 220. To that end, the interface logic 350 generates the necessary data and control signals that enable data to be transferred between the backplane 220 and the packet memory 360 and host processor 310.

The packet memory 360 comprises memory devices (not shown) capable of storing packets received by the interface logic 350. Preferably, these memory devices are industry standard high-speed memory storage devices, such as Rambus Dynamic Random Access Memory (RDRAM) devices available from Rambus, Inc., Los Altos, California.

Broadly stated, packets are received from the network 100 by the line cards 210 zo and sent over the switch fabric backplane 220 to the switching fabric 230 for further processing. The switching fabric 230 examines header information contained in the packets and forwards the packets to the appropriate card coupled to the switch fabric backplane 220. Packets destined for the route processor module 300 are received by the interface logic 350 and placed in the packet memory 360. The interface logic 350 informs the host processor 310 of the arrival of a packet. The processor 320 processes the packet in part by issuing requests to the system controller 330 to access the packet data stored in the packet memory 360. Further processing, including the queuing of the packets to the coprocessors' FIFO queues, is performed by executing instructions and manipulating data stored in the processor memory 340.

The present invention comprises a technique that efficiently allocates processing of a packet to one of a plurality of coprocessors in a manner that optimizes load balancing among the coprocessors. To that end, the novel load balancing technique considers an anticipated load when determining which coprocessor to select for processing the packet. The anticipated load is the load a coprocessor would incur if it were to process the packet given its current load. By taking into consideration the anticipated load, the present technique avoids unduly unbalancing the loads allocated among the coprocessors.

Figure 4:
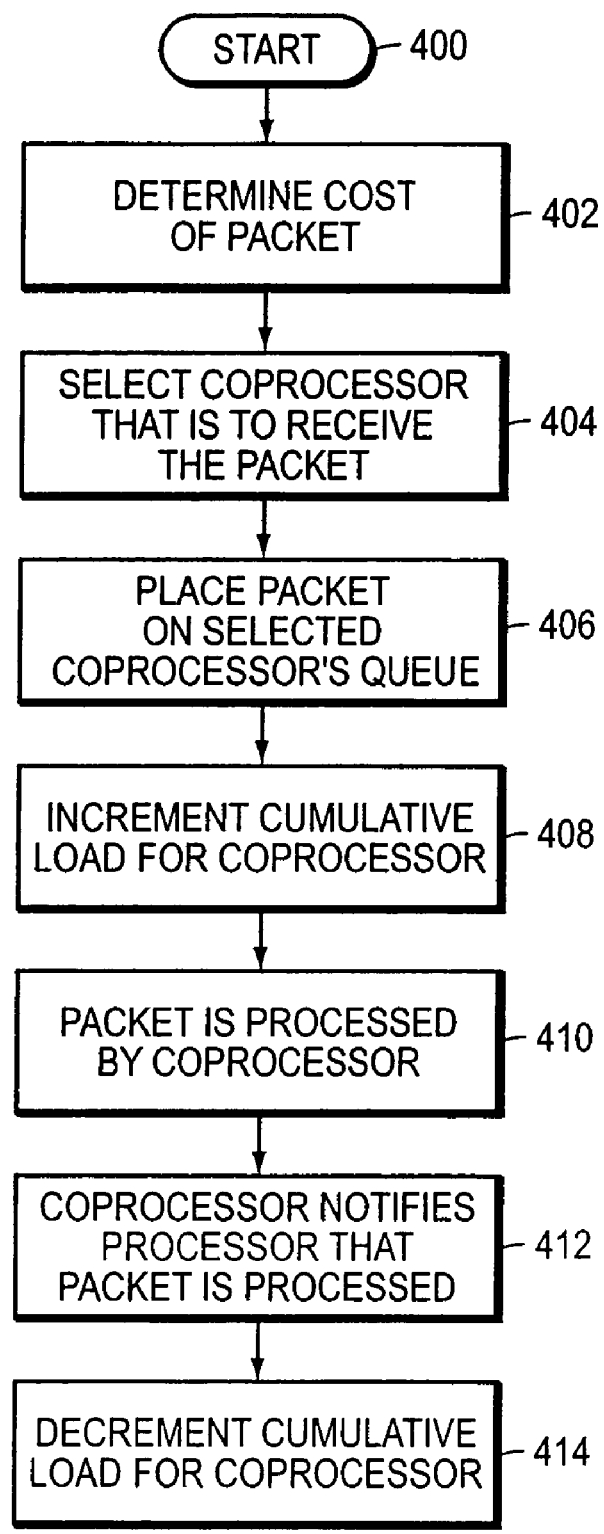
FIG. 4 is a high-level flow diagram of a novel load balancing technique in accoris dance with the present invention.

FIG. 4 is a high-level flow diagram illustrating the sequence of steps involved with the novel load balancing technique of the present invention. Assume that module 300 to comprises two identical coprocessors 325a, 325b that can process packets using the DES standard at the same speed. Further assume, coprocessor 325a has three packets ("P1", "P2", and "P3") in its FIFO queue and coprocessor 325b has one packet ("P4") in its FIFO queue. Now, assume that processor 320 has a 4000-byte outbound packet ("P5") that needs to be further processed by one of the coprocessors 325. The sequence starts at Step 400 and proceeds to Step 402 where processor 320 determines a cost associated a coprocessor processing the packet. Broadly stated, the cost is a function of a processing rate (Ra) associated with a coprocessor processing the packet using a particular mathematical transform and a transfer rate (Rt) associated with transferring that packet to the coprocessor.

Figure 5:
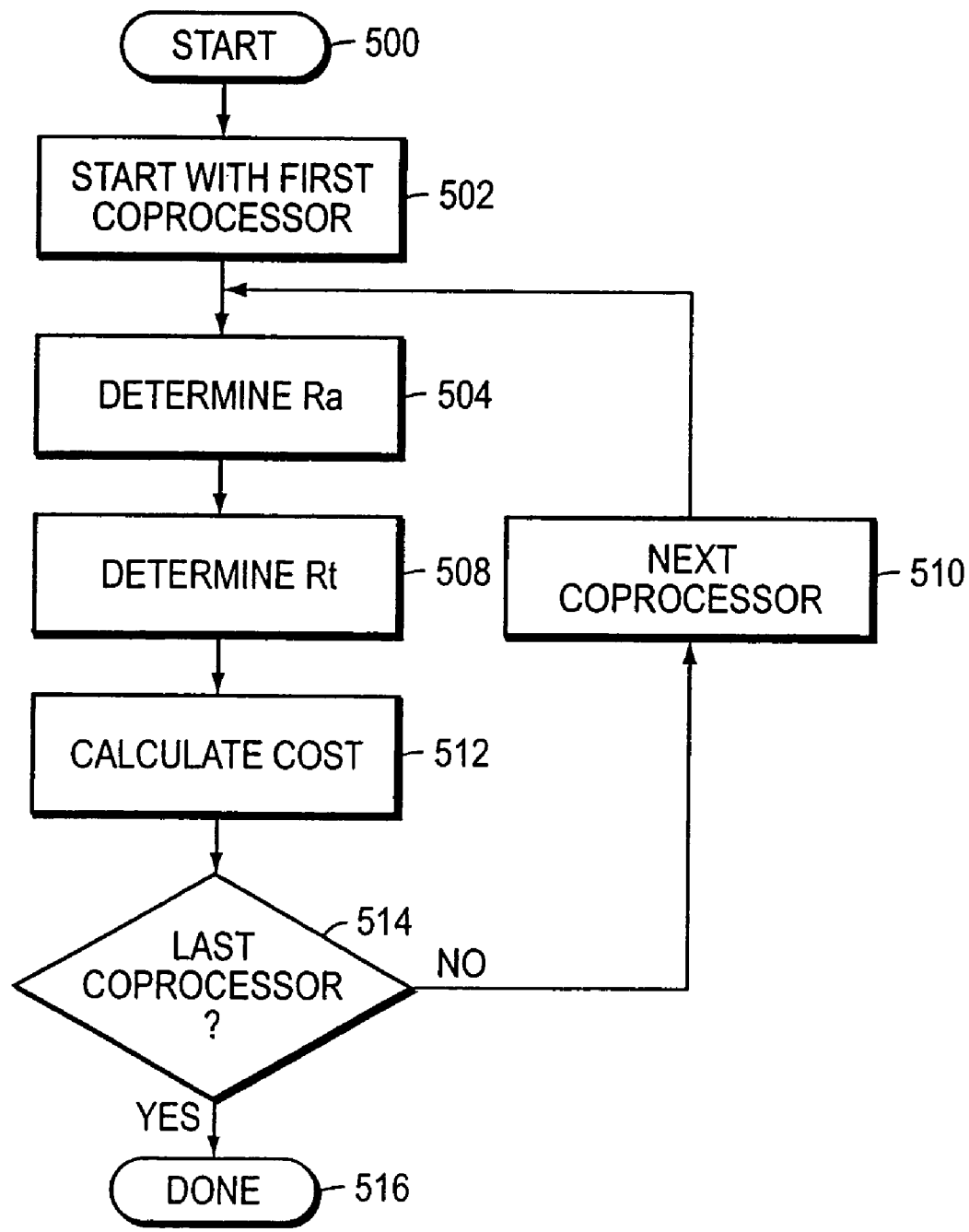
FIG. 5 is a flow diagram of a method that can be used to determine the cost of a packet.

FIG. 5 is a flow diagram illustrating the sequence of steps of a method that can be used by processor 320 to determine this cost. The sequence begins at Step 500 and proceeds to Step 502 where the processor 320 starts with the first coprocessor 325a. Next, at Step 504, processor 320 determines the rate ("Ra") that coprocessor 325a can process packet P5. In the illustrated embodiment, Ra represents the rate the coprocessor 325a can process the packet using the DES mathematical transform. Preferably, Ra is a predetermined value that is kept in a lookup table that is indexed by coprocessor ID and contained in data structure 345. Assume processor 320 accesses the lookup table entry associated with processor 325a and determines that the rate Ra coprocessor 325a can apply the DES transform is 200,000 bytes per second.

Next, at Step 508, processor 320 determines the transfer rate (Rt) that represents the rate associated with transferring a packet from processor 320 to coprocessor 325a. Preferably, Rt is a predetermined value that is kept in a lookup table that is indexed by coprocessor ID and contained in data structure 345. Assume processor 320 accesses the lookup table entry associated with coprocessor 325a and determines that processor 320 can transfer a packet to coprocessor 325a at a rate of 800,000 bytes per second.

Processor 320 then calculates the cost associated with having coprocessor 325a process packet P5, as indicated at Step 512. The cost represents the load a coprocessor 325 would incur if it were to process the packet. The cost is calculated using the following equation, where "S" represents the size of packet P5:

$$cost = S/Ra + S/Rt$$

Applying the values for S, Ra and Rt above to the above equation, the cost associated with processing packet P5 on coprocessor 325a is 25 ms.

At Step 514, processor 320 determines if coprocessor 325a is the last coprocessor. Assuming coprocessor 325a is not the last processor, processor 320 follows the NO arrow to Step 510 to select the next coprocessor 325b and proceeds to Step 504. Steps 504-514 are repeated for all of the coprocessors 325. As indicated above, since coprocessor 325b can process packets at the same speed as coprocessor 325a, the cost associated with having coprocessor 325b process packet P5 is 25 ms. The sequence then ends at Step 516.

Figure 6:
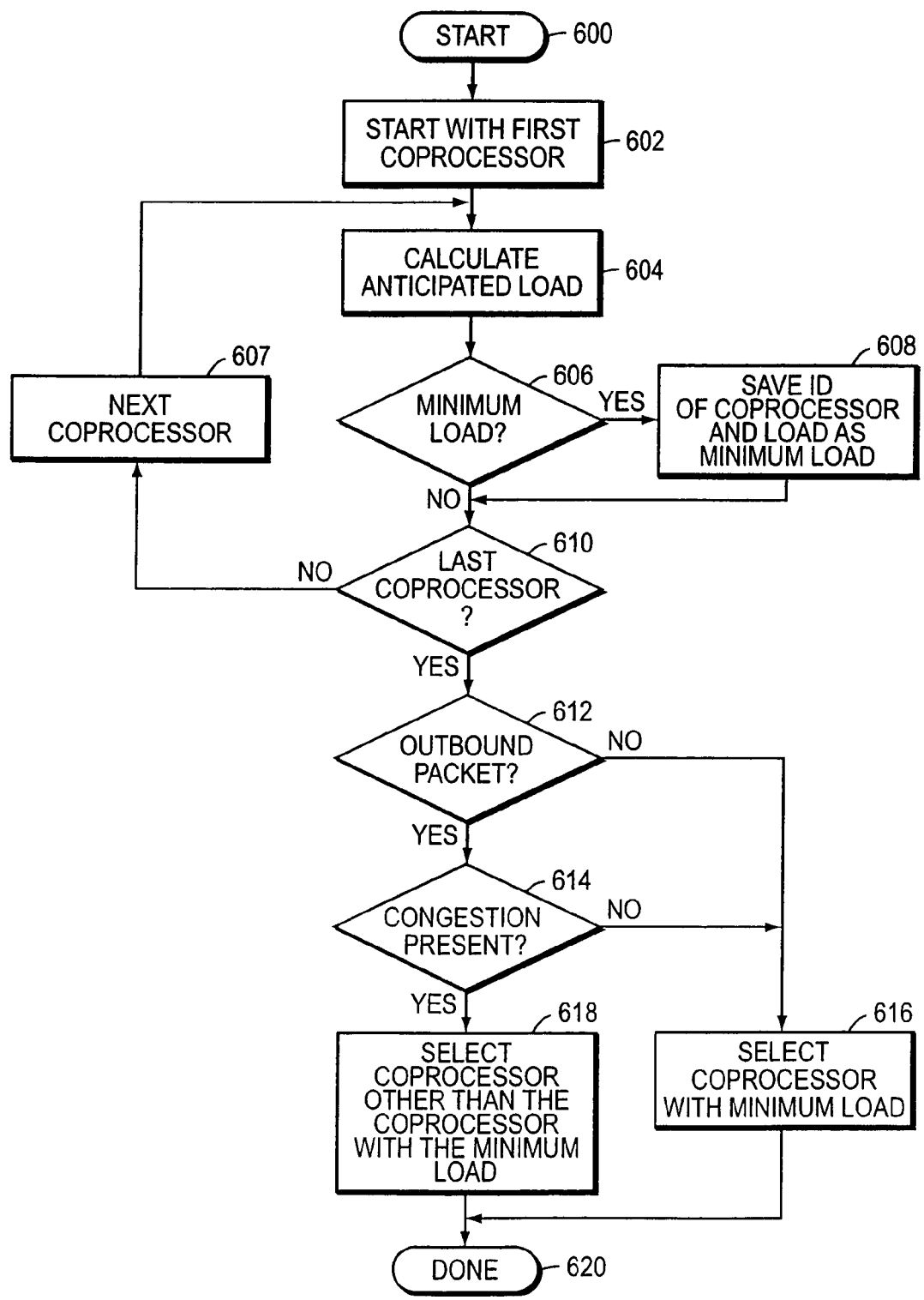
FIG. 6 is a flow diagram of a method that can be used to select a coprocessor that is to process a packet.

Referring again to FIG. 4, at Step 404, processor 320 selects the coprocessor 325 that is to process the packet using, among other things, the anticipated load of each coprocessor. FIG. 6 is a flow diagram illustrating the sequence of steps involved in a method used by processor 320 to select the coprocessor.

The sequence starts at Step 600 and proceeds to Step 602, where processor 320 selects with the first coprocessor 325a. Next, at Step 604, processor 320 calculates the anticipated load associated with coprocessor 325a. The anticipated load is calculated by adding the cost calculated for the coprocessor to a cumulative load associated with the selected coprocessor. The cumulative load is the sum total of the individual costs for each packet in the selected coprocessor's 325's FIFO queue. Preferably, the cumulative load is kept for each coprocessor 325 in a lookup table that is indexed by the coprocessor's 325's ID and contained in data structure 345. Assume that P1 has a cost of 25 ms, P2 has a cost of 30 ms and P3 has a cost of 20 ms. The cumulative load for coprocessor 325a is 75 ms which is the sum total of the costs for P1, P2 and P3. The anticipated load is calculated by adding packet P5's cost (i.e., 15 ms) to the cumulative load which yields an anticipated load of 100 ms.

At Step 606, processor 320 determines if the anticipated load for coprocessor 325a is the minimum load, that is, the anticipated load value represents the least load value of the anticipated load values encountered so far. Assuming it is, processor 320 follows the YES arrow to Step 608 where it saves the anticipated load value for coprocessor 325a as the minimum load.

At Step 610, processor 320 determines if coprocessor 325a is the last coprocessor. Assuming coprocessor 325a is not the last coprocessor, processor 320 follows the NO arrow to Step 607 where it selects the next coprocessor 325b and proceeds to Step 604. At Step 604, processor 320 calculates the anticipated load associated with coprocessor 325b. Assume that P4 has a cost of 125 ms, thus, the cumulative load for coprocessor 325b is 125 ms and the anticipated load is 150 ms.

Processor 320 then determines if the anticipated load for coprocessor 325b is the minimum load, as indicated at Step 606. Assuming it is not, the processor 320 follows the NO arrow and proceeds to Step 610 where processor 320 then determines if coprocessor 325b is the last coprocessor. Assuming coprocessor 325b is the last coprocessor, processor 320 follows the YES arrow to Step 612.

Processor 320 determines if packet P5 is an outbound packet as indicated at Step 612. If packet P5 is not an outbound packet, the process proceeds to Step 616 where the coprocessor with the minimum anticipated load is selected. However, as indicated above, P5 is an outbound packet, so processor 320 follows the YES arrow to Step 614.

At Step 614, processor 320 determines if congestion is present on the output port associated with P5. Preferably, congestion is determined by examining the depth of the transmit queue and the number of recent packet drops associated with the output port. Typically, congestion occurs on an output port when more traffic (data) is sent to the port than the port can handle. Congestion may be determined by examining the depth of the transmit queue associated with the port or the number of recent packet drops on the output port's interface. For example, assume an output port can handle packets at a rate of 1,000 bytes-per-second onto the network, yet packets are sent to the output interface at a rate that is greater than 1,000 bytes-per-second. The output port becomes congested because it is being sent data at a rate that is faster than the rate it can handle the data. Typically, in this situation, packets that cannot be handled are dropped. Assuming the port keeps a counter of the packets it drops, this counter can be examined to determine if it is to increasing and thereby indicating the port is congested. Likewise, assuming the port implements a transmit queue that is configured to hold traffic that cannot be transmitted immediately, as packets arrive at a rate that is faster than can be handled, the number of queue entries increase. Thus, the number of transmit queue entries can be examined to determine if the port is congested.

If congestion is present, the processor follows the YES arrow and proceeds to Step 618 where it selects a coprocessor 325 other than the coprocessor with the minimum load, as indicated at Step 618. Preferably, the coprocessor selected is the first coprocessor encountered that is not the coprocessor with the minimum load. If congestion is not present, the processor proceeds to Step 616 where it selects the coprocessor 325 that has the minimum load. Assume congestion is not present, so processor 320 selects coprocessor 325a. The sequence ends at Step 620.

Referring yet again to FIG. 4, at Step 406, processor 320 places packet P5 in the FIFO queue associated with coprocessor 325a. Next, at block 408, processor 320 increments coprocessor 325a's cumulative load value contained in data structure 345 by adding packet P5's cost to the existing cumulative load value and replacing the cumulative load value with the result.

Coprocessor 325a then processes packet P5, as indicated at Step 410. At Step 412, coprocessor 325a notifies processor 320 that it has completed processing packet P5. Processor 320 then decrements coprocessor 325a's cumulative load value by subtracting packet P5's cost from coprocessor 325a's cumulative load value and replacing the cumulative load value with the result, as indicated at Step 414.

It should be noted that in the illustrated embodiment described above, the first coprocessor with the minimum load is selected as the coprocessor to process the packet. However, in an alternative embodiment of the invention, if two or more coprocessors have the same minimum load, the coprocessor within the group of coprocessors that has the same minimum load is selected using a scheduling algorithm such as, e.g., the round-robin algorithm or SQF algorithm. Likewise in the illustrated embodiment, if the port associated with the packet is congested, the first coprocessor encountered other than the to first coprocessor with the minimum load is selected. However, in an alternative embodiment, if a group of more two or more coprocessors can be selected, the coprocessor is selected from the group using a scheduling algorithm as described above.

The illustrated embodiment of the invention is further described as calculating the cost using divide operations. However, this is not a requirement of the invention. Rather in an alternative embodiment of the invention, Ra and Rt are kept in a lookup table in the form of a multiplicative inverse equivalent to the actual rate. In this embodiment, the cost is calculated by multiplying Ra times the size of the packet and adding this product to the product calculated by multiplying Rt by the size of the packet.

It should be noted that in the above-described embodiments, the cost associated with processing the packet on a coprocessor is calculated using both Ra and Rt, however, this is not a requirement of the invention. That is in other embodiments of the invention, the calculation involving the Rt value is omitted. For example, in one embodiment the cost is calculated by dividing the packet size by Ra. In another embodiment, cost is calculated by multiplying the packet size by the multiplicative inverse of Ra.

It should be further noted that in the above-described embodiments, the cost associated with the packet is calculated, however, this also is not a requirement of the invention. In other embodiments, the cost associated with various packet sizes is calculated a priori using the methods described above and stored in one or more lookup tables. When the processor determines the cost of the packet, it looks up the cost in the appropriate lookup table. For example, in one embodiment the cost is kept in a series of lookup tables where each table represents the cost values associated with various packet sizes for a given coprocessor and transform algorithm. In this embodiment, a lookup table exists for each coprocessor/transform algorithm combination. The cost associated with a particular packet is determined by locating the table associated with the particular coprocessor/transform algorithm combination and applying the size of the packet to the table to select (determine) the cost. In other embodiments, the lookup tables are multidimensional, thus, the size of the packet, the coprocessor ID and the transform algorithm, or some combination of these, are applied to the one or more lookup tables to lookup the cost.

It should be further noted that in the illustrated embodiment of the invention, the cost associated with processing the packet on a coprocessor is determined for each coprocessor, however, this is not a requirement of the invention. In other embodiments where the coprocessors are identical, the cost is determined once since the cost will be the same for all the coprocessors.

Finally, it should be further noted that in the illustrated embodiment of the invention the processor 320 determines if the output port associated with the outbound packet is congested. However, this is not a requirement of the invention. In another embodiment, this determination is not performed, rather, the coprocessor 325 with the minimum load is selected.

In summary, the present invention incorporates a technique that enables packets to be assigned to coprocessors in a manner that avoids unbalancing the load among the coprocessors. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for selecting a coprocessor from a plurality of coprocessors to process a packet, the method comprising steps of:
   determining a size of the packet;
   determining a cost associated with the packet in response to the size of the packet, the cost representing a load associated with processing the packet;
   determining, by a processor, an anticipated load for each coprocessor in the plurality of coprocessors using the cost; and
   selecting, by the processor, the coprocessor from the plurality of coprocessors based on the anticipated load.

2. The method of claim 1 wherein the step of determining a cost further comprises the step of:
   calculating the cost using a rate associated with processing the packet.

3. The method of claim 2 wherein the rate is stored in a lookup table.

4. The method of claim 2 wherein the step of calculating the cost further comprising the step of:
   dividing the packet's size by the rate.

5. The method of claim 2 wherein the step of calculating the cost further comprises the step of:
   multiplying the packet's size by a multiplicative inverse of the rate.

6. The method of claim 1 wherein the step of determining a cost further comprises the step of:
   applying the packet's size to a lookup table containing one or more cost values to determine the cost.

7. The method of claim 1 wherein the step of determining an anticipated load further comprises the step of:
   adding the cost to a cumulative load associated with each coprocessor in the plurality of coprocessors.

8. The method of claim 1 wherein the step of selecting the coprocessor further comprises the step of:
   selecting the coprocessor from a group of one or more coprocessors whose anticipated load is a minimum load.

9. The method of claim 8 wherein the coprocessor is selected using a scheduling algorithm.

10. The method of claim 1 wherein the step of selecting the coprocessor further comprises the step of:
    determining if a port associated with the packet is congested.

11. The method of claim 10 wherein the step of selecting the coprocessor further comprises the step of:
    selecting the coprocessor from a group of one or more coprocessors whose anticipated load is not a minimum load.

12. The method of claim 10 wherein the step of selecting the coprocessor further comprises the step of:
    selecting the coprocessor from a group of one or more coprocessors whose anticipated load is a minimum load.

13. The method of claim 1 further comprising the step of:
    incrementing a cumulative load associated with the selected coprocessor.

14. The method of claim 13 wherein the step of incrementing a cumulative load further comprises the step of:
    adding the cost to the cumulative load.

15. The method of claim 1 further comprising the step of:
    decrementing a cumulative load associated with the selected coprocessor.

16. The method of claim 15 wherein the step of decrementing a cumulative load further comprises the step of:
    subtracting the cost from the cumulative load.

17. An apparatus for selecting a coprocessor from a plurality of coprocessors to process a packet, the apparatus comprising:
    a memory containing one or more software routines, including a software routine configured to determine a size of the packet, and to determine a cost associated with the packet in response to the size of the packet, the cost representing a load associated with processing the packet; and
    a processor configured to execute the software routines to determine an anticipated load for each coprocessor in the plurality of coprocessors using the cost and to select the coprocessor from the plurality of coprocessors based on the anticipated load.

18. The apparatus of claim 17 further comprising:
    a data structure;
    wherein the cost is determined using information contained in the data structure.

19. The apparatus of claim 18 wherein the information contained in the data structure includes the cost.

20. The apparatus of claim 18 wherein the information contained in the data structure includes a rate the coprocessor can process the packet.

21. An intermediate device configured to select a coprocessor from a plurality of coprocessors to process a packet, the intermediate device comprising:
    means for determining a size of the packet, and for determining a cost associated with the packet in response to the size of the packet, the cost representing a load associated with processing the packet;
    means for determining an anticipated load for each coprocessor in the plurality of coprocessors using the cost; and means for selecting the coprocessor based on the anticipated load.

22. A non-transitory computer readable media comprising computer executable instructions for execution in a processor for selecting a coprocessor from a plurality of coprocessors to process a packet, the instructions for:
  determining a size of the packet, and determining a cost associated with the packet in response to the size of the packet, the cost representing a load associated with processing the packet;
  determining an anticipated load for each coprocessor in the plurality of coprocessors using the cost; and
  selecting the coprocessor from the plurality of coprocessors based on the anticipated load.

23. A method for selecting a processor for processing a packet, the method comprising steps of:
  determining a size of the packet;
  determining a cost associated with the packet of that size, the cost representing a load associated with processing the packet;
  determining, by a module of an intermediate node, an anticipated load for the processor using the cost of the packet if processed by the processor; and
  selecting, by the module of the intermediate node, the processor based on the anticipated load.

24. The method of claim 23 wherein the step of determining a cost comprises the step of:
  calculating the cost using a rate associated with processing of the packet; and
  wherein the rate is stored in a lookup table.

25. The method of claim 23 wherein the step of determining a cost further comprises the step of:
  applying the size of the packet to a lookup table containing cost values associated with particular sizes.

26. A method for selecting a coprocessor from a plurality of coprocessors to perform a processing operation on a received packet, the method comprising steps of:
  determining a cumulative load for each coprocessor, the cumulative load representing load due to packets currently awaiting processing at that coprocessor;
  determining a size of the received packet;
  determining a cost for processing the received packet at each coprocessor, the cost determined, at least in part, in response to the size of the received packet and a processing rate of that coprocessor;
  combining the cumulative load and the cost at each coprocessor, to create an anticipated load for each coprocessor;
  comparing, by a processor, the anticipated loads of all the coprocessors; and
  selecting, by the processor, in response to the comparing, a particular coprocessor of the plurality of coprocessors to perform the processing operation on the received packet.

27. The method of claim 26, wherein the step of selecting further comprises the step of:
  selecting a coprocessor with minimum anticipated load to perform the processing operation on the received packet.

28. The method of claim 26, further comprising the step of:
  determining if congestion is present at an output port associated with the received packet, and if congestion is present, selecting a coprocessor with non-minimum anticipated load to perform the processing operation on the received packet.

29. The method of claim 26, wherein the step of determining a cumulative load for each coprocessor further comprises the step of:
  determining, for each coprocessor, sizes of the packets currently awaiting processing at that coprocessor and using the sizes in conjunction with the processing rate of that coprocessor to determine the cumulative load.

30. The method of claim 26 wherein the processing operation is an encryption operation.

31. An apparatus to select a coprocessor from a plurality of coprocessors to perform a processing operation on a received packet, the apparatus comprising:
  a plurality of queues configured to store packets currently awaiting processing, each queue associated with one of the coprocessors, each queue associated with a cumulative load that represents a load to process packets in that queue;
  a data structure configured to store processing rates, each processing rate associated with one of the coprocessors; and
  a processor configured to determine a size of the received packet, and in response to the size of the received packet, and the processing rate of each coprocessor, determine a cost to perform a processing operation on the received packet at each coprocessor, the processor further configured to combine the cost at each coprocessor with the cumulative load at that coprocessor to create an anticipated load at each coprocessor, and to select a particular coprocessor to perform the processing operation on the received packet in response to comparison of the anticipated load at each coprocessor.

32. The apparatus of claim 31, wherein the processor is further configured to select a coprocessor with minimum anticipated load to perform the processing operation on the received packet.

33. The apparatus of claim 31, wherein the processor is further configured to determine if congestion is present at an output port associated with the received packet, and if congestion is present, select a coprocessor with non-minimum anticipated load to perform the processing operation on the received packet.

34. The apparatus of claim 31, wherein the cumulative load associated with each coprocessor is determined in response to sizes of packets awaiting processing in the queue associated with that coprocessor and the processing rate of that coprocessor.

35. The apparatus of claim 31, wherein the processing operation is an encryption operation.

* * * * *

UNITED STATES PATENT AND TRADEMARK OFFICE
CERTIFICATE OF CORRECTION

PATENT NO. : 8,005,978 B1
APPLICATION NO. : 10/087376
DATED : August 23, 2011
INVENTOR(S) : John B. Duffie, III Page 1 of 1

It is certified that error appears in the above-identified patent and that said Letters Patent is hereby corrected as shown below:

Col. 4, line 9: "Cisco Systems, Incorporated, San Jose, ~~Califormia~~ California. The"

Col. 5, line 40: "available from Rambus, Inc., Los Altos, ~~Califormia~~ California."

Col. 6, line 4: "~~to~~ comprises two identical coprocessors 325a, 325b that can"

Col. 7, line 63: "examined to determine if it is ~~to~~ increasing and thereby indicating"

Col. 8, line 37: "~~to~~ first coprocessor with the minimum load is selected."

Signed and Sealed this
First Day of May, 2012

David J. Kappos
*Director of the United States Patent and Trademark Office*